July 18, 1933.                F. LAUSTER                1,919,068
                          TEMPERATURE REGULATOR
                           Filed Feb. 26, 1930
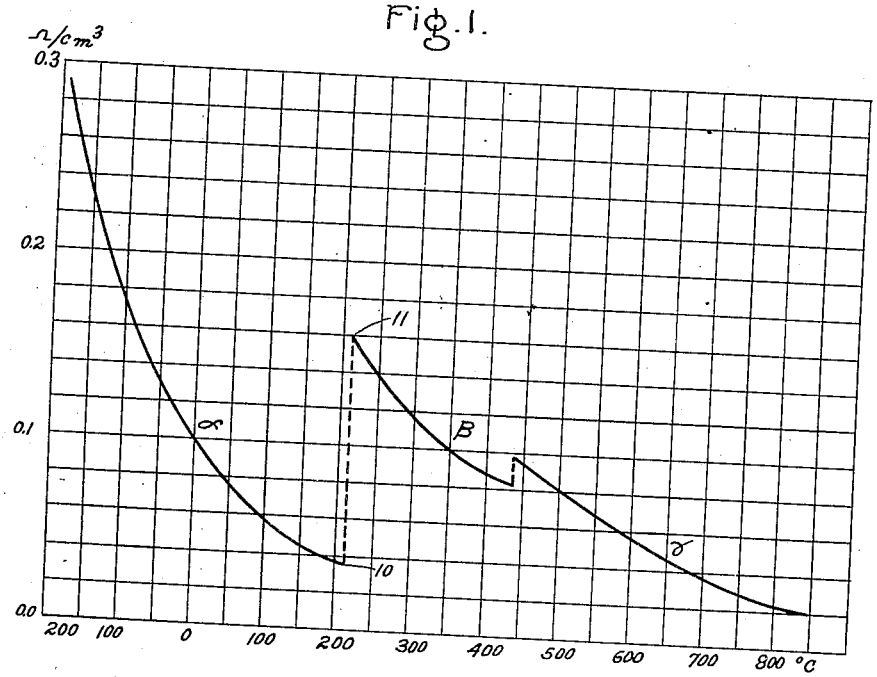
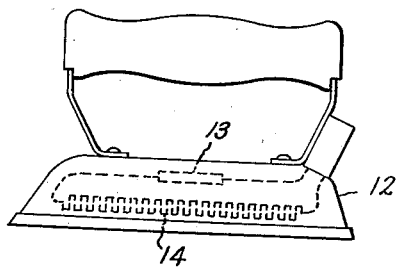
Inventor:
Franz Lauster,
by Charles E. Mullen
    His Attorney.

Patented July 18, 1933

1,919,068

UNITED STATES PATENT OFFICE

FRANZ LAUSTER, OF BERLIN-STEGLITZ, GERMANY, ASSIGNOR TO GENERAL ELECTRIC COMPANY, A CORPORATION OF NEW YORK

TEMPERATURE REGULATOR

Application filed February 26, 1930, Serial No. 431,606, and in Germany April 10, 1929.

This invention relates to temperature regulators, more particularly to temperature regulators for electrically heated devices.

Heretofore the tempeature of electrically heated apparatus has been regulated by means of a temperature responsive circuit controlling device which served to effect the switching on and off of the supply of electric energy. Generally, these devices function by reason of the expansion by heat of solid, liquid or gaseous bodies which, for instance, causes a mercury switch to tip and control the heating circuit. Also bimetallic strips or disks have been employed which change their shape under the influence of changing temperatures. The switching operation may be effected either in the open air or within evacuated or gas filled receptacles. In this connection the bimetallic body can be heated by radiation and conduction, by external heating, or by suitable resistance heating.

In the application heretofore referred to, a zig-zag shaped temperature curve results, the form of which depends upon the inertia of the regulator. Another difficulty lies in the occurrence of arcs, even though only small ones, at the contact points which reduce the life of the regulator, particularly when working with direct current.

It has been proposed to allow the regulator to work on a cycle which depends upon the relation of a physical magnitude to the temperature in order to control the supply of electrical energy with the least inertia and without switching operations. Hitherto, however, only the temperature dependence of the permeability of ferro-magnetic materials has been exploited for regulators of this kind. Such regulators are not, however, generally employable since they do not react in like manner on direct and alternating current.

According to this invention, a temperature regulator is provided which controls the supply of electric energy, and which works on a cycle representing the temperature dependence of a physical magnitude, but which is characterized by the fact that the element controlling the supply of the electric energy, more particularly the temperature dependence of its physical propery functioning for the control, is independent of the current whereby the regulator may be used for both direct and alternating current.

In one embodiment of the invention a varying electric conductivity of a material, more particularly silicon, is utilized as the temperature dependent physical property.

In the accompanying drawing, Fig. 1 represents a typical resistance-temperature curve for silicon, the resistance in ohms per cm³ being plotted as ordinates and the temperature in degrees centigrade being plotted as abscissas, while Fig. 2 is a diagrammatic view of an electric flatiron embodying the invention.

It will be observed from the drawing that the specific resistance of the silicon at about 215 degrees C. shows an abrupt increase of magnitude to about four-fold amount, as represented by the distance from point 10 to point 11. This is due to the internal conversion of the material from the alpha state to the beta state, which conversion is reversible. This silicon series resistance is built into an electrically heated device, such as a flatiron 12 (Fig. 2), in such a way that it is connected directly in the heating circuit so as to carry the heating current, but without being appreciablely heated by its own resistance heating effect. As shown in Fig. 2, the silicon resistor 13 is connected in the heating circuit of the heating resistor 14. The resistance of this silicon resistor will vary in accordance with the temperature prevailing in the flatiron and will thus regulate the heating current and hence the heating capacity of the flatiron. By suitably arranging the silicon resistor regulator in the flatiron it is possible to make its temperature lag behind the temperature of the flatiron so that a desirable sole or ironing face temperature may be attained at a given silicon resistor regulator temperature of 215 degrees C. Furthermore, by adjusting the height of the regulator over the heating element of the flatiron, the sole temperature may be adjusted whereby the temperature of the iron may be adapted for lighter and heavier goods.

Calculations show, for instance, that a bar of silicon of 3 mm. diameter and 12 cm. length at 215 degrees C. regulating temperature would choke the flatiron capacity from 600 watts down to 180 watts. Experience shows that this latter amount is sufficient to supply the radiation and conduction losses of the flatiron at 250 degrees C.

The heat lost in the series silicon resistor can be utilized to a certain degree as heating capacity so that it is not a pure loss.

The regulator described not only furnishes very uniform regulating curves but it is extraordinarily reliable in operation and of great durability owing to the limination of switch contacts. Furthermore, the regulator is not sensitive to changes in position, nor to atmospheric influences.

What I claim as new and desire to secure by Letters Patent of the United States, is:—

1. The combination with an electrically heated device provided with an electric heating resistor, of a silicon regulating resistance connected in series circuit with said heating resistor characterized by an abrupt increase in resistance when its temperature reaches a predetermined critical temperature and by a correspondingly abrupt decrease in resistance when its temperature falls below said critical temperature, said regulating resistance being arranged to be heated by said resistor and being so proportioned to said resistor as to maintain the temperature of said device in a predetermined relation to said critical temperature.

2. The combination with an electrically heated device provided with a heating resistor and a working surface, of a temperature regulating device therefor comprising a resistance made of silicon connected in series with said resistor, said resistance being mounted on said device in such predetermined thermal relation with said heating resistor and being so proportioned to said resistor that when said working surface is heated to a predetermined maximum temperature said regulating resistance is heated to a predetermined critical temperature at which its resistance increases abruptly and thereby reduces the rate of heat generation of said resistor to effect temperature regulation of said working surface.

3. The combination with an electrically heated device provided with an electric heating resistor for heating said device to a predetermined working temperature, of a regulating resistance made of silicon connected in series with said heating resistor, said regulating resistance and said resistor having their resistances so proportioned with respect to each other and being so thermally related on said device that at temperatures below said working temperature said heating resistor generates heat at a rate greater than the heat losses of said device to heat said device to said predetermined working temperature and said regulating resistance to a critical temperature at which its resistance increases abruptly and thereby reduces the heat output of said resistor to a value below the heat losses of said device at said working temperature, whereby the temperature of said device is regulated.

4. The combination with an electrically heated device provided with a working surface, of a heating resistor for said device having a normal rate of heat generation substantially greater than the normal heat losses of said device to thereby produce an increase in temperature of said working surface up to a predetermined working temperature, a regulating resistance made of silicon or the like on said device connected in series with said heating resistor and having normally a low resistance as compared with the resistance of said heating resistor, said regulating resistance being mounted on said device in such predetermined good thermal relation with said heating resistor and so proportioned to said resistor that when said working surface is heated by said resistor to said predetermined working temperature, said regulating resistance is heated by said resistor to a critical temperature at which its resistance increases abruptly to a relatively high value and thereby reduces the rate of heat generation of said heating resistor to a value lower than the heat losses of said device at said working temperature, whereby the temperature of said device is limited substantially to said predetermined working temperature.

FRANZ LAUSTER.